US010204645B2

(12) United States Patent
Hutchinson et al.

(10) Patent No.: US 10,204,645 B2
(45) Date of Patent: Feb. 12, 2019

(54) HEATER DESIGN WITH LOCALLY DECREASED RESISTANCE AREA FOR FLY HEIGHT CONTROL

(71) Applicant: Seagate Technology LLC, Cupertino, CA (US)

(72) Inventors: Erik J. Hutchinson, Eden Prairie, MN (US); Paul J. Sonda, Minneapolis, MN (US); Richard E. Martin, Longmont, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/815,369

(22) Filed: Nov. 16, 2017

(65) Prior Publication Data

US 2018/0174603 A1  Jun. 21, 2018

Related U.S. Application Data

(63) Continuation of application No. 15/435,676, filed on Feb. 17, 2017, now Pat. No. 9,842,614.

(60) Provisional application No. 62/301,745, filed on Mar. 1, 2016.

(51) Int. Cl.
*G11B 5/31* (2006.01)
*G11B 5/60* (2006.01)
*G11B 5/29* (2006.01)

(52) U.S. Cl.
CPC ............. *G11B 5/3133* (2013.01); *G11B 5/29* (2013.01); *G11B 5/314* (2013.01); *G11B 5/607* (2013.01)

(58) Field of Classification Search
CPC .................. G11B 5/3133; G11B 5/607
USPC ......................... 360/125.31, 294.7
See application file for complete search history.

(56) References Cited

U.S. PATENT DOCUMENTS

| | | | |
|---|---|---|---|
| 6,937,435 B2 | 8/2005 | Saliba | |
| 7,649,714 B2 | 1/2010 | Kato et al. | |
| 7,701,676 B2 | 4/2010 | Kubotera et al. | |
| 7,961,429 B2* | 6/2011 | Kurihara | G11B 5/11 360/125.31 |
| 8,081,398 B2 | 12/2011 | Hachisuka | |
| 8,144,427 B2* | 3/2012 | Antoku | G11B 5/314 360/125.31 |
| 9,058,829 B1 | 6/2015 | Wolf et al. | |
| 9,472,224 B2 | 10/2016 | Macken et al. | |
| 2003/0174430 A1 | 9/2003 | Takahashi et al. | |
| 2004/0027709 A1 | 2/2004 | Hamaguchi et al. | |
| 2007/0146933 A1 | 6/2007 | Matsumoto | |
| 2007/0247758 A1 | 10/2007 | Kurita et al. | |
| 2008/0019041 A1 | 1/2008 | Aoki | |
| 2008/0094755 A1* | 4/2008 | Ota | G11B 5/102 360/235.4 |
| 2009/0251821 A1 | 10/2009 | Song et al. | |

(Continued)

*Primary Examiner* — Jefferson A Evans
(74) *Attorney, Agent, or Firm* — Holzer Patel Drennan

(57) ABSTRACT

Implementations described and claimed herein includes a storage device comprising a transducer head including at least one pair of read/write elements and a heat element to thermally protrude regions of the transducer head including the read/write elements. According to one implementation, the heat element includes at least one conductive portion of locally decreased resistance proximal to and between the pair of read/write elements to direct the thermally protruded close point away from a midpoint between the read/write elements.

20 Claims, 6 Drawing Sheets

(56) References Cited

U.S. PATENT DOCUMENTS

| | | | |
|---|---|---|---|
| 2009/0251828 A1* | 10/2009 | Schreck | B82Y 10/00 |
| | | | 360/319 |
| 2011/0149430 A1 | 6/2011 | Shiramatsu et al. | |
| 2012/0120522 A1* | 5/2012 | Johnson | G11B 5/607 |
| | | | 360/75 |
| 2013/0163108 A1* | 6/2013 | Hutchinson | G11B 5/607 |
| | | | 360/59 |
| 2013/0286807 A1* | 10/2013 | Gao | G11B 13/08 |
| | | | 369/13.33 |
| 2014/0268386 A1 | 9/2014 | Li et al. | |
| 2014/0347760 A1 | 11/2014 | Johnson et al. | |
| 2015/0062754 A1 | 3/2015 | Peng et al. | |
| 2015/0213820 A1* | 7/2015 | Chembrolu | G11B 5/607 |
| | | | 360/75 |
| 2015/0235659 A1 | 8/2015 | Sasaki et al. | |
| 2016/0148629 A1 | 5/2016 | Gao et al. | |
| 2016/0293194 A1* | 10/2016 | Contreras | G11B 5/607 |
| 2017/0263274 A1* | 9/2017 | Kurihara | G11B 5/3912 |

* cited by examiner

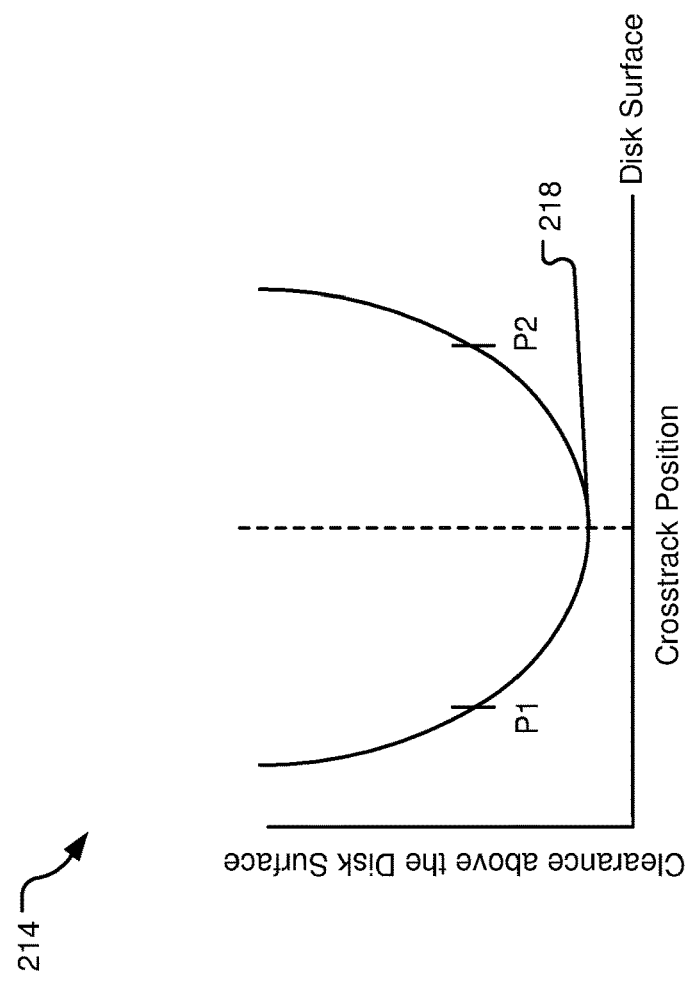
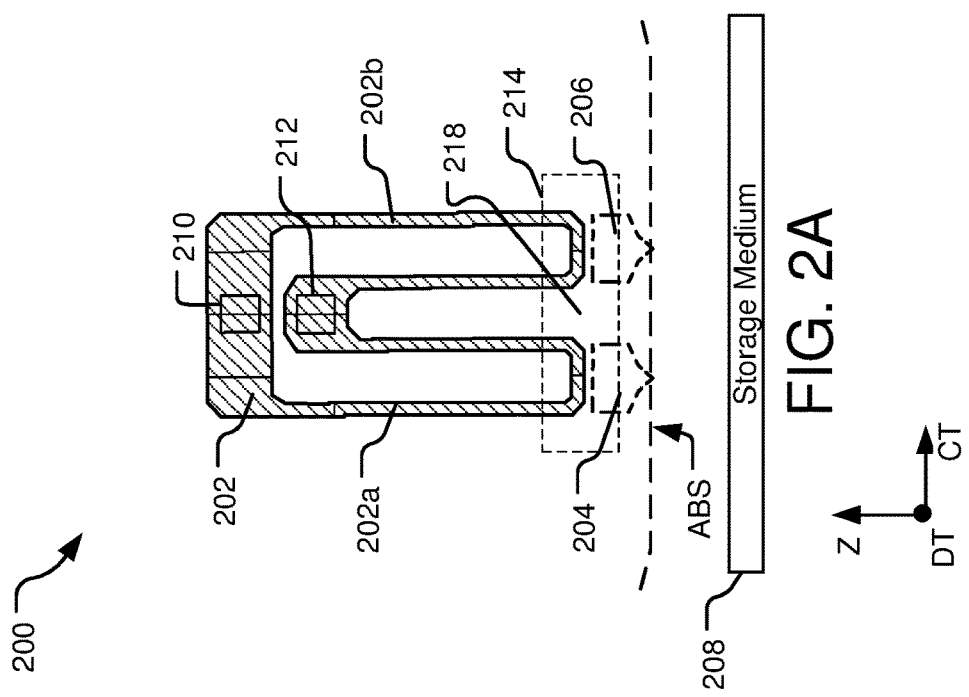
FIG. 2B
FIG. 2A

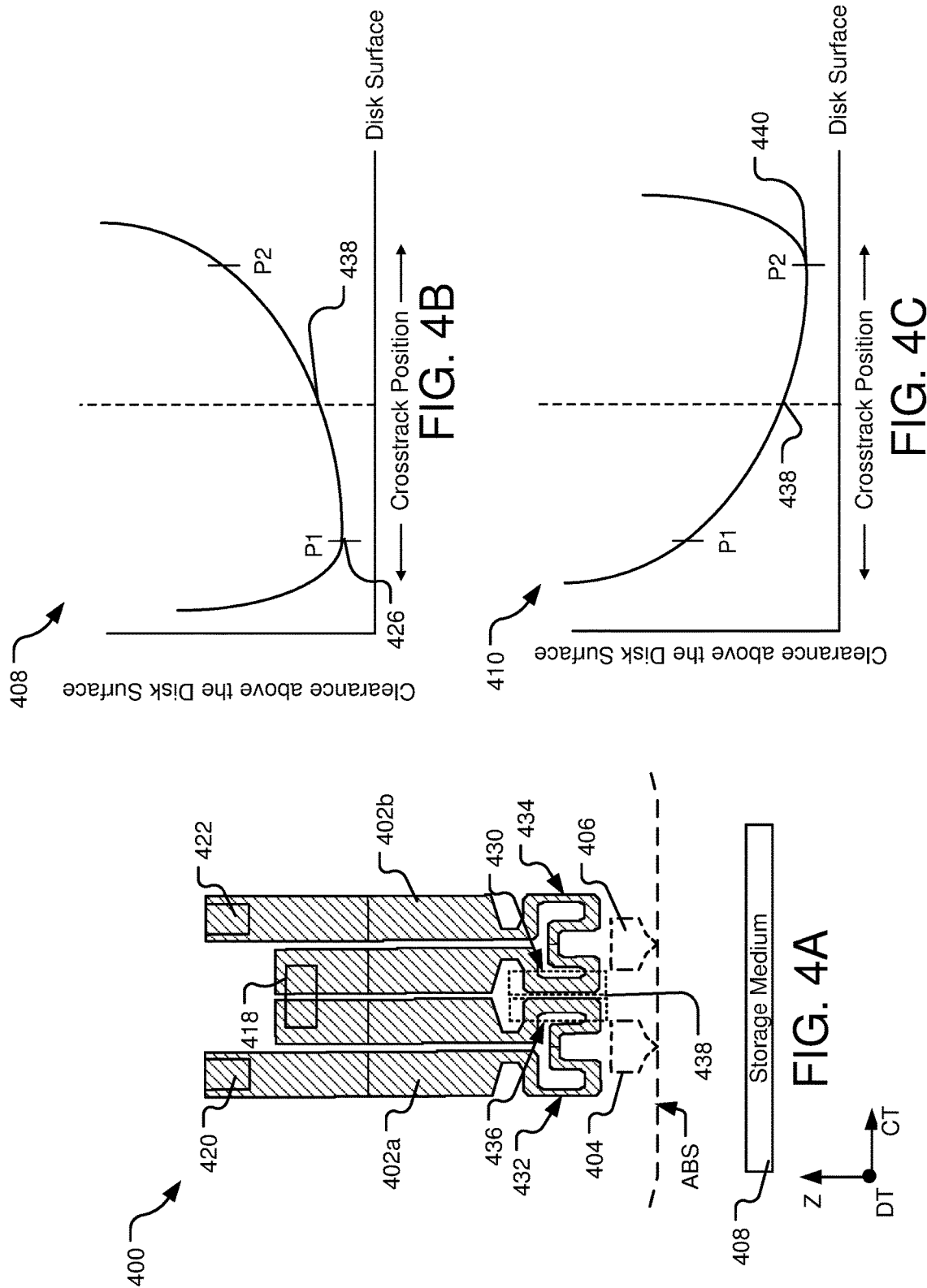

HEATER DESIGN WITH LOCALLY DECREASED RESISTANCE AREA FOR FLY HEIGHT CONTROL

PRIORITY CLAIM

The present application claims priority to U.S. patent application Ser. No. 15/435,676, filed on Feb. 17, 2017 and titled "Heater Design for Fly Height Control," now U.S. Pat. No. 9,842,614, which claims priority to U.S. Patent Application Ser. No. 62/301,745 filed Mar. 1, 2016, and titled "Heater Design for Fly Height Control." Each of these applications is hereby incorporated by reference for all that they disclose or teach.

BACKGROUND

Some storage devices include heaters proximal to read and/or write elements to provide active fly height control to specific parts of a transducer head during data access operations. For example, bit error rates can be decreased by locally heating a read or write element during use, causing the read or write element to protrude from an air bearing surface of a transducer head and toward an adjacent surface of a storage medium. Localized heating may, for example, target a center of a read or write element.

A variety of emerging storage device technologies now utilize transducer heads with multiple readers and/or writers. The small size of transducer heads limits available heater placement options and connection points, creating difficulties in aligning regions of localized heating with centers of read and write elements.

SUMMARY

One implementation described and claimed herein provides for a storage device with a transducer head including a pair of read/write elements and a heat element for creating a thermally protruded close point on the transducer head. The heat element includes at least one conductive portion of locally decreased resistance proximal to and between the pair of read/write elements to direct the thermally protruded close point away from a midpoint between the read/write elements.

This Summary is provided to introduce a selection of concepts in a simplified form that are further described below in the Detailed Descriptions. This Summary is not intended to identify key features or essential features of the claimed subject matter, nor is it intended to be used to limit the scope of the claimed subject matter. These and various other features and advantages will be apparent from a reading of the following Detailed Descriptions.

BRIEF DESCRIPTIONS OF THE DRAWINGS

FIG. 2A illustrates a cross-sectional view of an example heat element taken along a plane perpendicular to an adjacent rotating storage medium.

FIG. 2B is a graph showing approximate positioning of a thermally protruded close point of a transducer head generated by the example heat element of FIG. 2A.

FIG. 4A illustrates a cross-sectional view of another example heat element taken along a plane perpendicular to an adjacent rotating storage medium.

FIG. 4B illustrates a graph showing approximate positioning of a first thermally protruded close point generated by the example heat element of FIG. 4A.

FIG. 4C illustrates a graph showing approximate positioning of another thermally protruded close point generated by the example heat element of FIG. 4A.

DETAILED DESCRIPTIONS

Some storage device technologies target an exact center of a read or write element when applying localized heating to thermally protrude areas of the transducer head. This alignment can be challenging to achieve, particularly when read or write elements are placed in close proximity to one another. Some of the heater shaping techniques described below utilize conductive regions of increased and decreased resistance to control close point positioning. As used herein, the term "close point" refers to, for example, the closest point between a transducer head and a rotating storage medium at a given point in time during use. For example, a write element or a read element may be thermally protruded while in use to form a region of protrusion on a transducer head surface adjacent to the storage medium.

The herein disclosed techniques may be particularly useful when integrated into transducer heads with read and write elements placed in tight proximity to one another, such as when two or more read or write elements share a heater or one or more bond pads supplying current to a heater. Since the disclosed heater shaping techniques are useful to thermally protrude both write elements and read elements, the term "read/write element" is used herein to refer to either a read or write element. Likewise, the term "read/write pair" may refer to a pair of read elements, a pair of write elements, or a pair that includes one read element and one write element.

Figure 1:
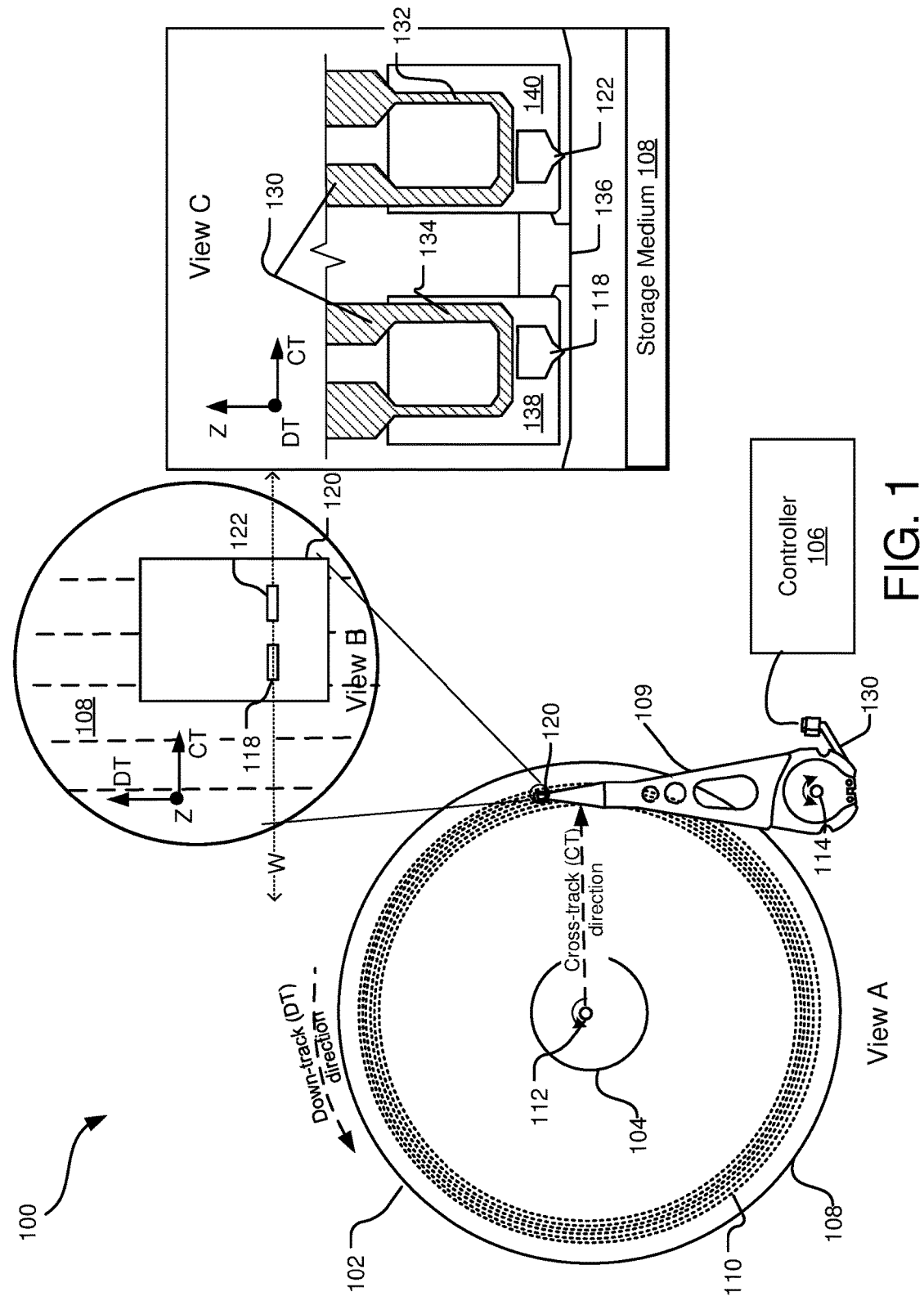
FIG. 1 illustrates a data storage device including an example transducer head assembly for writing data on a magnetic storage medium.

FIG. 1 illustrates a data storage device 100 including a transducer head assembly 120 for writing data on a magnetic storage medium 108. Although other implementations are contemplated, the magnetic storage medium 108 is, in FIG. 1, a magnetic storage disc on which data bits can be recorded and from which data bits can be read. As illustrated in View A, the storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the storage medium 108.

The transducer head assembly 120 is mounted on an actuator assembly 109 at an end distal to an actuator axis of rotation 114. The transducer head assembly 120 flies in close proximity above the surface of the storage medium 108 during disc rotation. The actuator assembly 109 rotates during a seek operation about the actuator axis of rotation 112 to position the transducer head assembly 120 over a target data track for read and write operations.

The transducer head assembly 120 includes at least a pair of read/write elements, such as example read/write elements 118, 122. View B illustrates a top-down view of the transducer head assembly 120 including the write elements 113, 122. The read/write elements 118 and 122 are also shown in View C, which is a cross-sectional view of the transducer head assembly 120 taken along a plane labeled 'W' in View B. In View C, the read/write elements 118 and 122 are shown to be two write elements (e.g., shaped to include write pole tips proximal to the storage medium 108). However, in other implementations, the pair of read/write elements 118, 122 are a pair of read elements or a pair including one read element and one write element. The read/write elements 118 and 122 are shown, in View B, to be in a cross-track alignment. In another implementation, the read/write elements 118 and 122 are aligned in a down-track direction. The transducer head assembly 120 may include read/write elements in addition to those shown. For example, the read/write elements 118, 122 may be a pair of write elements and the transducer head assembly 120 may include one or multiple read elements. Likewise, the read/write elements may be a pair of read elements and the transducer head assembly 120 may include one or multiple write elements.

In general, write elements emits a series of magnetic pulses each of sufficient magnitude to perform a write transition on an individual data bit on the storage medium 108 as it rotates adjacent to the transducer head assembly 120. Each write transition changes a magnetic state of an underlying region of magnetic material (e.g., a magnetize data bit). Read elements, in comparison, utilize magnetoresistance to read data from the storage medium 108.

When either of the read/write elements 118, 122 is active (e.g., reading data from the storage medium 108 or writing data to the storage medium 108), a controller 106 of the data storage device 100 directs a current through a heat element 130 of the transducer head assembly 120 to apply localized heat to the read/write element 118 or 122. In one implementation, the heat element 130 includes a conductive element shaped to cause one or more high heat spots—or regions of localized heating—in areas that align with centers of the active read/write elements. These regions of localized heating cause the active read/write elements 118, 122 to thermally protrude from the transducer head assembly 120 and toward the adjacent storage medium 108.

In various implementations, the heat element 130 may have different shapes and features depending on the arrangement of the read/write elements 118, 122 as well as the inclusion, non-inclusion, and/or arrangement of other features of the transducer head assembly 120. In some implementations, the heat element 130 creates the two or more close spots via two or more individual heat elements arranged in a series or parallel configuration. In other implementations, the heat element 130 creates two or more close spots via two or more independently selectable individual heat elements.

In FIG. 1, the heat element 130 is a continuous piece of conductive material. In other implementations, such as that explored in FIG. 4A-4C, the heat element 130 includes two or more separate pieces of conductive material. Thinner portions (e.g., a thin portion 132) of the heat element 130 provide regions of increased resistance, locally concentrating heat, while wider portions (e.g., a wider portion 134) of the heat element 130 provide regions of decreased resistance, concentrating less heat than the thinner regions. Notably, the heat element 130 includes these wider portions of decreased resistance (e.g., the wider portion 134) between the two heat elements in an area adjacent to an air bearing surface (ABS) of the transducer head. These decreased resistance areas drive the close points away from a midpoint 136 between the read/write elements 118, 122 along the cross-track direction and outward, toward centers of each of the read/write elements 118 and 122.

Metallic pushblocks 138 and 140 provide a thermally conductive interface between the heat element 130 and read/write elements 118 and 122. In one implementation, the read/write elements 118 and 122 are write elements and the metallic pushblocks 138 and 140 transfer heat directly to write coils of the write elements, such as via direct or very near contact. In one implementation, the metallic pushblocks 138 and 140 reside on outer flanks of the write coil structure. Therefore, the size and shape of the metallic pushblocks may depend on the shape and width of the heat element 130.

FIG. 2A illustrates a cross-sectional view of an example heat element 200 taken along a plane perpendicular to an adjacent rotating storage medium 208. In one implementation, the heat element 200 is integrated into a transducer head assembly that reads and writes data to the storage medium 208. Example positions of read/write elements 204 and 206 and air-bearing surface (ABS) of the transducer head assembly are shown in dotted lines to indicate relative example positioning; however, specific features the read/write elements 204, 206 and other components of a transducer head assembly have been intentionally excluded from the illustration for simplicity.

The heat element 200 includes two heaters 202a and 202b connected in parallel to two bond pads 210, 212, serving as a current feed and ground point. In another implementation, the two heaters 202a and 202b are connected serially rather than in parallel. Each of the heaters 202a, 202b includes a conductive segment substantially parallel to the ABS and adjacent to (e.g., axially aligned with) the corresponding read/write element 204 or 206. In contrast, the heat element 200 does not include a conductive segment adjacent to the ABS between the read/write elements 204 and 206 within the ABS region 214. Compared to traditional rectangular-shaped heating elements, this overall shape may help to reduce an intensity of localized heating that occurs at a midpoint 218 on a transducer head assembly between the write elements 204 and 206. However, as shown in FIG. 2B, the design of the heat element 200 still results in a close point between the two read/write elements 204 and 206 rather than in alignment with either of the two write elements.

Specifically, FIG. 2B includes a graph 214 showing approximate positioning of a thermally protruded close point 218 of a transducer head generated by the heat element 200 of FIG. 2A. The close point 218 occurs at a midpoint between the read/write elements 204, 206 (with positions indicated by "P1" and "P2" respectively). Thus, although the design of the heat element 200 may yield better performance that other designs, this design does not achieve precise close point alignment with the centers of either of the read/write elements 204, 206.

Figures 3A, 3B:
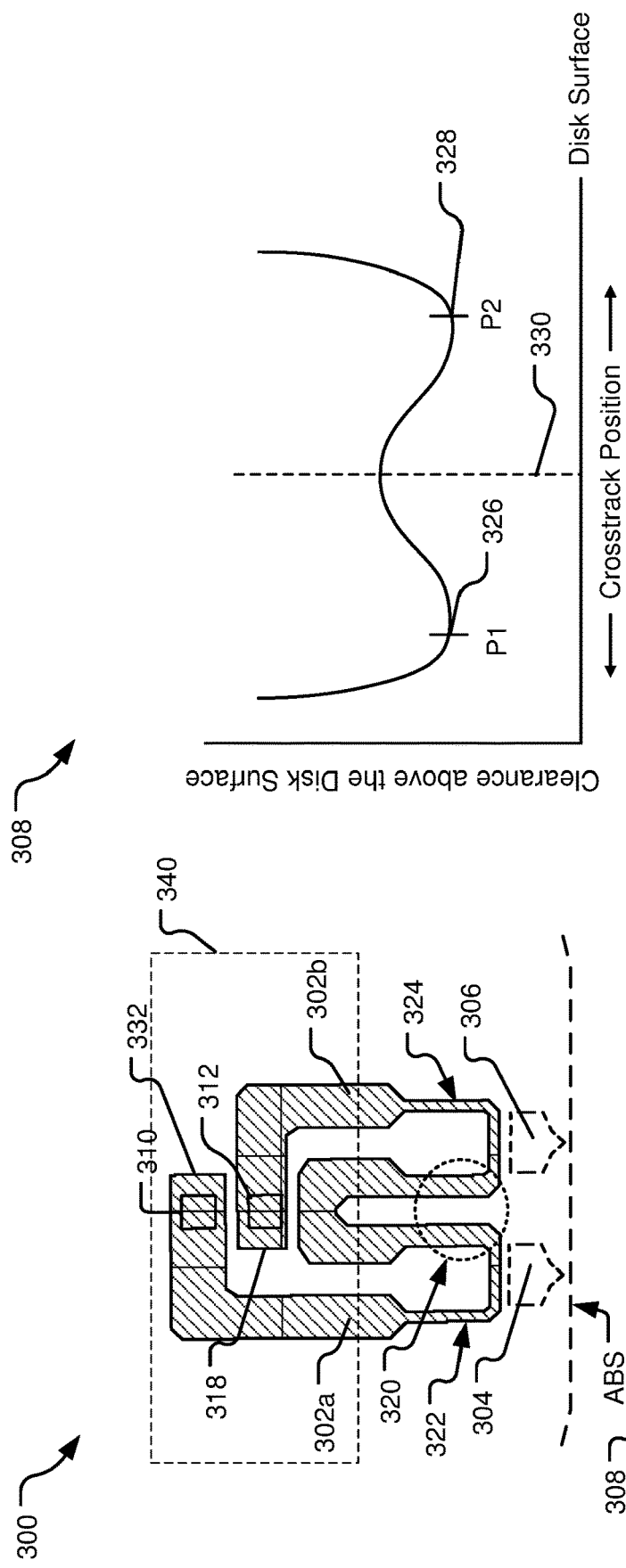
FIG. 3A illustrates a cross-sectional view of another example heat element taken along a plane perpendicular to an adjacent rotating storage medium.
FIG. 3B illustrates a graph showing approximate positioning of thermally protruded close points that are generated as a result of the shape of the example heat element illustrated in FIG. 3A.

FIG. 3A illustrates a cross-sectional view of another example heat element 300 along a plane perpendicular to a rotating storage medium 308. In one implementation, the heat element 300 is integrated into a transducer head assembly that reads and writes data to the storage medium 308. Example positions of read/write elements 304 and 306 and air-bearing surface (ABS) of the transducer head assembly are shown in dotted lines; however, specific features the read/write elements 304, 306 and other components of a transducer head assembly have been intentionally excluded from the illustration for simplicity.

The heat element 300 includes two heaters 302a, 302b connected to one another in series and to two bond pads 310 and 312. The bond pads 310 and 312 serve to provide a current feed and ground point. In another implementation, the heaters 302a, 302b are connected in parallel (e.g., ends 318 and 332 of the heat element 300 are electrically connected to one another as in FIG. 2). Like the heaters of FIG. 2, the heaters 302a and 302b each include a conductive segment substantially parallel to the storage medium 308 in an ABS region 314 directly overlying the corresponding read/write element 304 or 306.

Unlike the heaters of FIG. 2, the heat element 302 includes regions proximal to the ABS that are of varying width. Specifically, the two heaters 302a, 302b are wider in a central region 320 between the read/write elements 304 and 306 to provide decreased resistance as compared to outside edge regions 322 and 324, which are narrower to provide increased resistance and concentrate heat. In one implementation, the areas of decreased resistance in the central region 320 and the areas of increased resistance in the outside edge regions 322 and 324 intersect a same axis parallel to an air-bearing surface (ABS) of a transducer head and the adjacent storage medium 308. This shaping effectively diverts heat away from the central region 320, causing more heat to build up in outer regions aligned with the read/write elements 304 and 306.

FIG. 3B illustrates a graph 308 showing approximate positioning of thermally protruded close points 326 and 328 that are generated by the heat element 300 illustrated in FIG. 3A. In particular, the outside edge regions 322, 324 of increased resistance drive hot spots away from a midpoint 330 of the read/write elements 304 and 306 (e.g., away from the central region 320 of decreased resistance) and to positions indicated by "P1" and "P2" respectively, where P1 and P2 generally align with the centers of the read/write elements 304 and 306. Notably, the heater designs of both FIG. 2A and FIG. 3A include wide flat portions in a back region 340 distal to the ABS. These wide flat portions also provide low resistance, protecting nearby sensitive electronics from exposure to high heat conditions.

FIG. 4A illustrates a cross-sectional view of another example heat element 400 along a plane perpendicular to a rotating storage medium 408. In one implementation, the heat element 400 is integrated into a transducer head assembly that reads and writes data to the storage medium 408. Example positions of read/write elements 404 and 406 and ABS of the transducer head assembly are shown in dotted lines; however, specific features the read/write elements 404, 406 and other components of a transducer head assembly have been intentionally excluded from the illustration for simplicity.

The heat element 400 includes two independently operable heaters 402a and 402b. The heaters 402a and 402b each are coupled to an independent current feed via one of bond pads 420 and 422, respectively, and also share a bond pad 418 that acts as a current drain. The heaters 402a and 402b are each shaped to provide decreased resistance in corresponding central regions 430 and 436 near the ABS of the storage medium 408 and between the two read/write elements 404 and 406. In the central region 436, conductive material of the heater 402a is wider than within an outer region 432 of the heater 402a. Likewise, conductive material of the heater 402b is wider in the central region 430 than within the outer region 434. This shaping effectively diverts heat away from the central region 430, causing more heat to build up in the outer regions 432 and 434 where resistance of the heat element 400 is locally higher than in the central regions 430 and 436.

FIG. 4B illustrates a graph 408 showing approximate positioning of a first thermally protruded close point 426 generated when the heater 402a is actively generating heat and the heater 402b is not. In particular, the outer region 432 of increased resistance drives localized heating away from a midpoint 438 between the read/write elements 404, 406, and to a position P1, aligned with the read/write element 404 of FIG. 4A.

FIG. 4C illustrates a second graph 410 showing approximate positioning of a second thermally protruded close point 440 generated when the heater 402b is actively generating heat and the heater 402a is not. The outer region 434 of high resistance drives localized heating away from the midpoint 438 and to the position P2, which is aligned with the read/write element 406.

Figure 5:
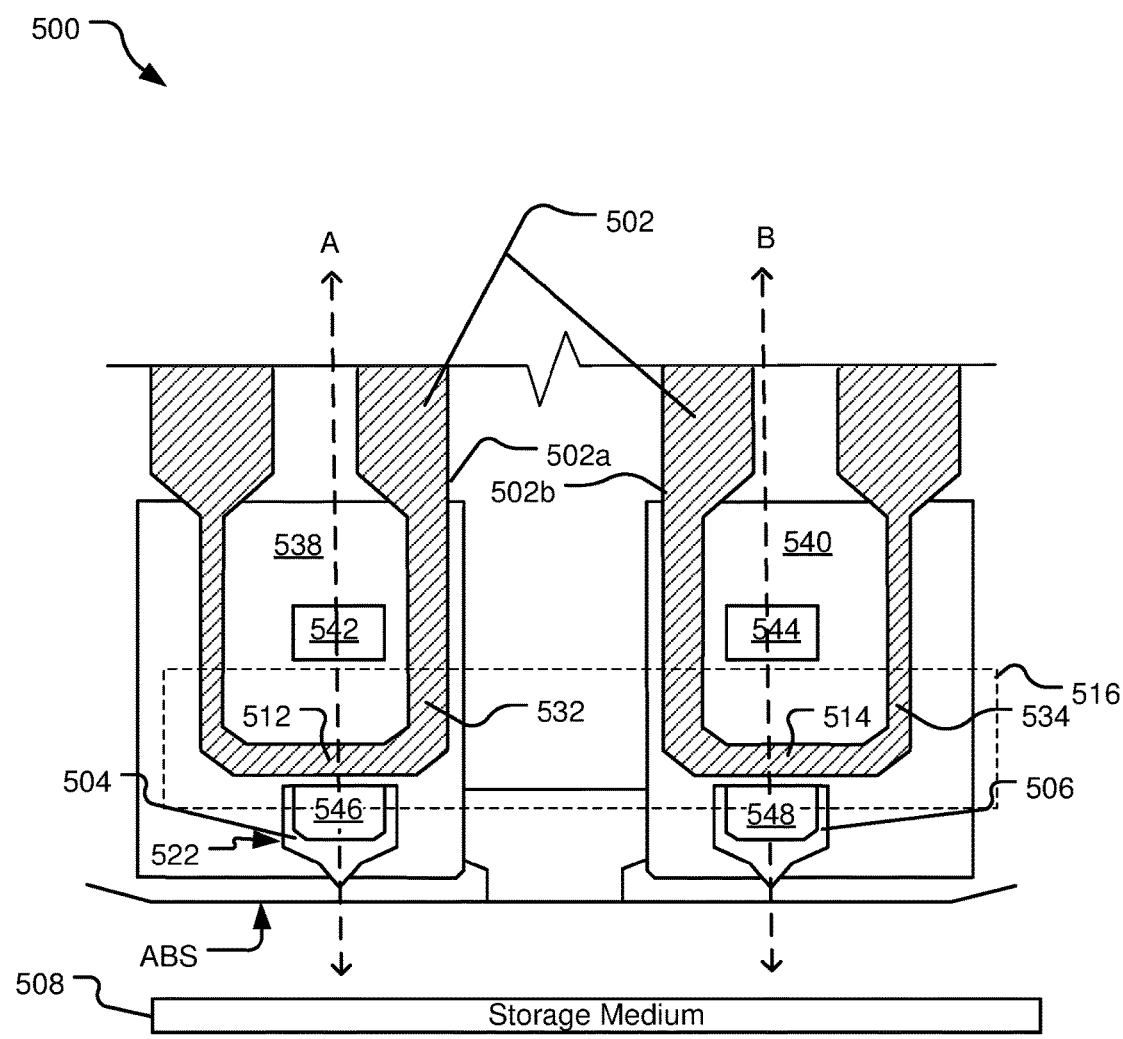
FIG. 5 illustrates a cross-sectional view of a transducer head assembly with an example heat element shaped for close point alignment with two write elements.

FIG. 5 illustrates a cross-sectional view of a transducer head assembly 500 with an example heat element 502 shaped for close point alignment with two write elements 504 and 506. The illustrated cross-sectional view is taken along a plane perpendicular to a rotating storage medium 508. The heat element 502 includes two heaters 502a and 502b. In various implementations, the heaters 502a, 502b may be connected either in parallel or series and may operate jointly or independent of one another. The heaters 502a, 502b each include an ABS-parallel portion 512, 514 positioned to locally heat a corresponding axially-aligned write element (e.g., either of write elements 504 or 506). In various implementation, the ABS-parallel portions 512 and 514 may be either in contact with or in very near proximity to a surface of the axially-aligned write element 504 or 506.

Metallic pushblocks 538 and 540 aid in the transfer of heat between the heaters 502a, 502b and the write elements 504 and 506. Although other shapes are contemplated, the pushblocks 538 and 540 of FIG. 5 are generally rectangular in shape. In one implementation, the pushblocks 538 and 540 rest in direct contact with the corresponding write elements 504 or 506. For example, the write elements 504 and 506 may be formed directly on top of the pushblocks 538 and 540 during a series of semiconductor processing operations. In another implementation, the metallic pushblocks 538 and 540 and write elements 504 and 506 assume an opposite arrangement wherein the pushblocks 538 and 540 are formed on top of the already-formed write elements 504 and 506. The pushblocks 538 and 540 may be made from a variety of suitable low-resistance materials including without limitation copper, gold, rhodium, ruthenium, and other thermally conductive non-magnetic materials with high coefficients of thermal expansion.

The heat element 502 includes regions of varied width that create localized areas of high and low electrical resistance to concentrate heat proximal to the write elements 504 and 506. Regions of low resistance (e.g., a thick region of low resistance 532) are positioned in an ABS-proximal region 516 between parallel central axes A and B of the two writers 504 and 506 while regions of higher resistance (e.g., a thin region of higher resistance 534) are positioned within the ABS-proximal region 516 but on opposite sides of the two writers 504, 506, as shown (e.g., regions that are not between the central axes A and B of the write elements 504 and 506).

As a result of the design of the heat element 502, heat is concentrated in the higher resistance outside perimeter regions of the heaters 502a and 502b, such as the lower resistance region 534, creating thermally protruded spots on the ABS of the transducer head 500 that are close to the center of the write elements 504 and 506. The pushblocks or write coil structures 538 and 540 aid in further conducting heat to outside edge portions of the write elements, such as an outside edge portion 522, where the heat element 502 does not itself contact or rest adjacent to the write elements 508 and 510.

In addition to those elements discussed above, FIG. 5 also generally illustrates relative positions of other structures included in some implementations. For example, the transducer head assembly 500 may include write coil connection vias 542, 544 and/or magnetic write vias 546, 548 for the core structure. In various implementations, the heat element 502 may assume different shapes and sizes to facilitate electrical access to these and other vias, which themselves may vary in size and shape from one implementation to another.

Figure 6:
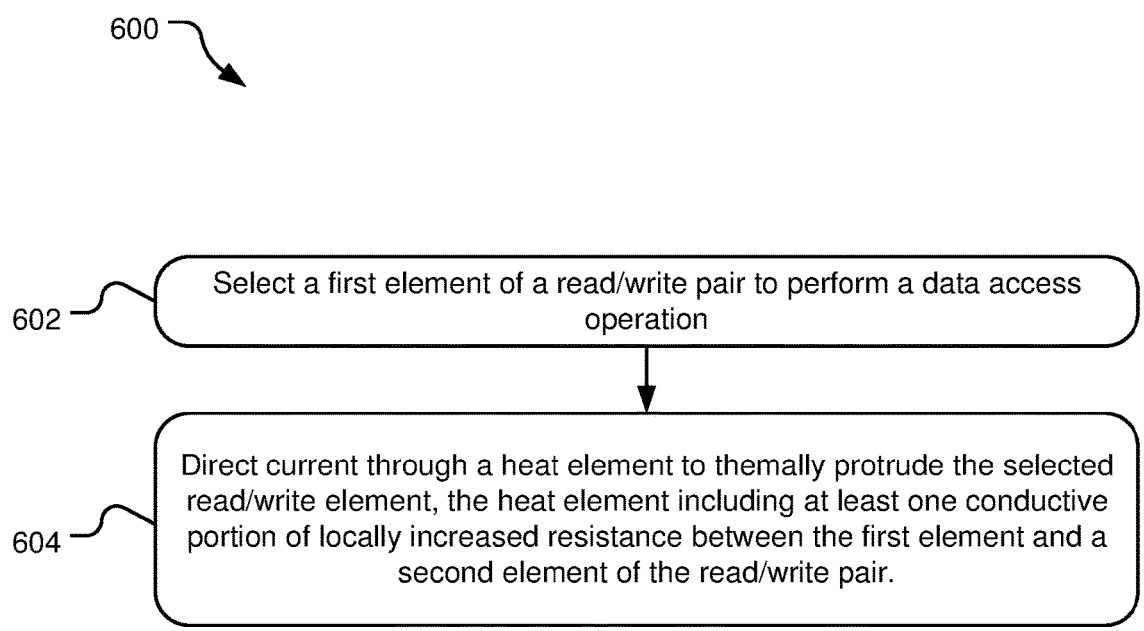
FIG. 6 illustrates example operations for thermally protruding a read/write element with a heater shaped for close point control.

FIG. 6 illustrates example operations 600 for thermally protruding a read/write element with a heater shaped for close point control. A first selection operation 602 selects a first element of a read/write pair to perform a data access operation. In one implementation, the read/write element pair includes two writers in a cross-track or down-track alignment. In another implementation, the read/write element pair includes two read elements positioned in a down-track or cross-track alignment.

A direction operation 604 directs current through a heat element to thermally protrude the selected read/write element. The heat element includes at least two heaters that are connected in parallel, series, or independently operable. In one implementation, the two heaters include a central portion of locally decreased resistance encompassing an area that includes a midpoint between the two heaters. The two heaters may further include conductive regions portions of locally increased resistance in an ABS-proximal region of the transducer head, such as within a plane generally parallel to the ABS.

Heat from the heaters may be further directed to the read/write elements by metallic pushblocks, such as those shown and described in detail with respect to FIG. 5. A centrally-located gap in the pushblocks between the read/write elements helps to direct thermally-formed close points away from a central region between the write elements and toward the center of the selected read/write element.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. Apparatus comprising:
   a transducer head including a pair of read/write elements positioned along two parallel axes bounding a central region; and
   a heat element for creating a thermally protruded close point on the transducer head, the heat element including:
   at least one conductive portion of locally decreased resistance within the central region; and
   at least one conductive portion of locally increased resistance positioned external to the central region, the at least one conductive portion of locally decreased resistance directing the thermally protruded close point away from a midpoint between the read/write elements and toward the conductive portion of locally increased resistance.

2. The apparatus of claim 1, wherein the conductive portion of locally increased resistance and the conductive portion of locally decreased resistance intersect an axis substantially parallel to an air-bearing surface of the transducer head.

3. The apparatus of claim 1, wherein the pair of read/write elements includes two writers in a down-track or cross-track alignment.

4. The apparatus of claim 1, wherein the heater element includes two heaters connected in series.

5. The apparatus of claim 1, wherein the heat element includes two heaters connected in parallel.

6. The apparatus of claim 1, wherein the heater element includes two independently controllable heat elements.

7. The apparatus of claim 1, wherein the pair of read/write elements define two parallel axes bounding a central region and the heat element further includes at least two portions of locally increased resistance positioned external to the central region and on opposite sides of the read/write elements of the pair.

8. The apparatus of claim 1, wherein the heat element transfers heat to outside edge regions of the read/write elements via metallic pushblocks.

9. The apparatus of claim 8, wherein the metallic pushblocks further comprise:
   two metallic pushblocks separated from one another by a gap between the read/write elements.

10. A storage device comprising:
    a storage medium;
    a transducer head including a pair of read/write elements; and
    a heat element for protruding the read/write elements toward the storage medium, the heat element including a conductive portion of locally decreased resistance and a conductive portion of locally increased resistance in a same plane parallel to an air-bearing surface of the transducer head, the portion of locally decreased resistance positioned between the read/write elements of the pair.

11. The storage device of claim 10, wherein the pair of read/write elements define two parallel axes perpendicular to the storage medium that bound a central region including the conductive portion of locally decreased resistance, and wherein the conductive portion of locally increased resistance is positioned external to the central region and proximal to an air bearing surface of the transducer head.

12. The storage device of claim 10, wherein the portion of locally increased resistance causes the thermally protruded close point to move away from a midpoint of the read/write elements of the pair and toward one of the read/write elements of the pair.

13. The storage device of claim 10, wherein the pair of read/write elements includes two writers in a down-track or cross-track alignment.

14. The storage device of claim 10, wherein the heater element includes two heaters connected in series.

15. The storage device of claim 10, wherein the heat element includes two heaters connected in parallel.

16. The storage device of claim 10, wherein the pair of read/write elements define two parallel axes bounding a central region and the heat element includes at least two portions of locally increased resistance positioned external to the central region and on opposite sides of the read/write elements of the pair.

17. A method comprising:
   selecting a first element of a read/write element pair to perform a data access operation;
   directing current through a heat element to thermally protrude the selected read/write element from an air-bearing surface of a transducer head, the heat element including at least one conductive portion of locally increased resistance and at least one conductive portion of locally decreased resistance that intersect a same axis parallel to the air-bearing surface, the portion of locally decreased resistance positioned between the first element and a second element of the read/write element pair.

18. The method of claim 17, wherein the first element and the second element define two parallel axes bounding a central region including the conductive portion of locally decreased resistance and the conductive portion of locally increased resistance is positioned external to the central region.

19. The method of claim 17, wherein the heat element transfers heat to outside edge regions of the read/write elements via two metallic pushblocks separated from one another by a gap between the read/write elements.

20. The method of claim 17, wherein the portion of locally increased resistance causes the thermally protruded close point to move away from a midpoint of the read/write elements of the pair and toward one of the read/write elements of the pair.

\* \* \* \* \*